(12) United States Patent
Austin

(10) Patent No.: US 7,287,799 B2
(45) Date of Patent: Oct. 30, 2007

(54) TAILGATE LIFT ASSIST DAMPENING DEVICE

(75) Inventor: Donald Mossom Austin, Perkinsfield (CA)

(73) Assignee: M & C Corporation, Sterling Heights, MI (US)

( * ) Notice: Subject to any disclaimer, the term of this patent is extended or adjusted under 35 U.S.C. 154(b) by 170 days.

(21) Appl. No.: 11/261,558

(22) Filed: Oct. 31, 2005

(65) Prior Publication Data
US 2007/0096492 A1    May 3, 2007

(51) Int. Cl.
*B62D 33/03* (2006.01)
*B62D 33/033* (2006.01)

(52) U.S. Cl. .......................... 296/57.1; 49/322; 49/181

(58) Field of Classification Search ............... 296/57.1; 49/322, 181, 386, 387
See application file for complete search history.

(56) References Cited

U.S. PATENT DOCUMENTS 5,358,301 A * 10/1994 Konchan et al. ......... 296/146.1
6,769,729 B1 * 8/2004 Bruford et al. ............... 296/50
6,793,263 B1 * 9/2004 Bruford et al. ............... 296/50
6,796,592 B1 * 9/2004 Austin ....................... 296/57.1

* cited by examiner

*Primary Examiner*—D. Glenn Dayoan
*Assistant Examiner*—Melissa A Black
(74) *Attorney, Agent, or Firm*—Nixon & Vanderhye P.C.

(57) ABSTRACT

A tailgate counterbalancing hinge assembly includes a linear torque rod, a first end assembly and a second end assembly secured to the torque rod. A first end assembly pivotally supports the tailgate while permitting a torque rod end to be rigidly coupled to the tailgate for movement with the tailgate about a pivot axis. A second end assembly also pivotally supports the tailgate and permits the other end of the torque rod to be rigidly connected to the vehicle body. The first end assembly includes a bushing and split pivot body rotatably mounted within the bushing that creates increasing friction between the split pivot body and the bushing as the torque rod is twisted due to the tailgate being opened. The increasing friction creates a progressively increasing braking or dampening effect, which slows the free fall of the tailgate as it is opened.

16 Claims, 5 Drawing Sheets

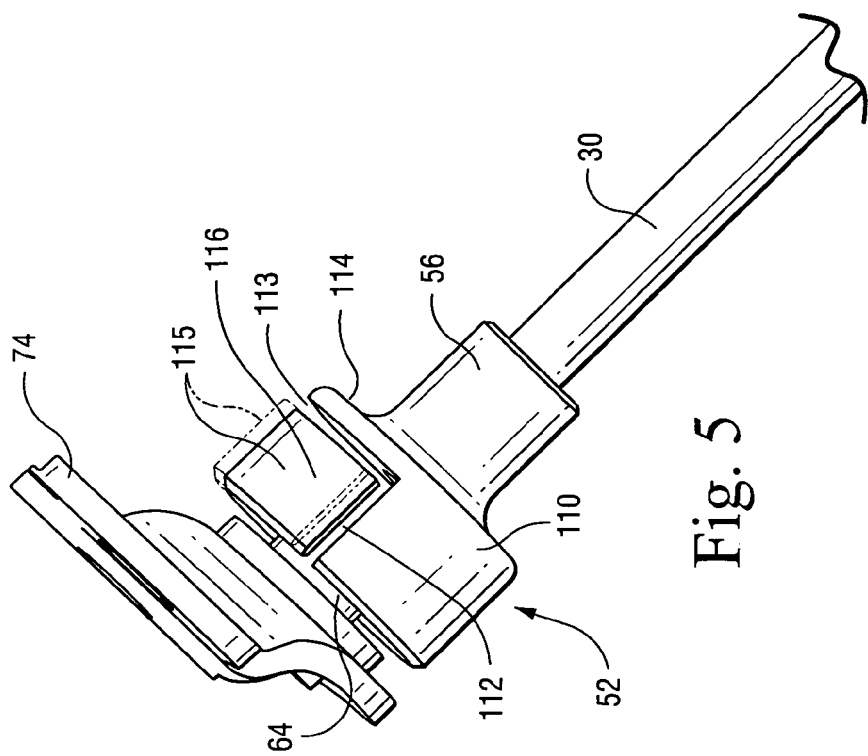
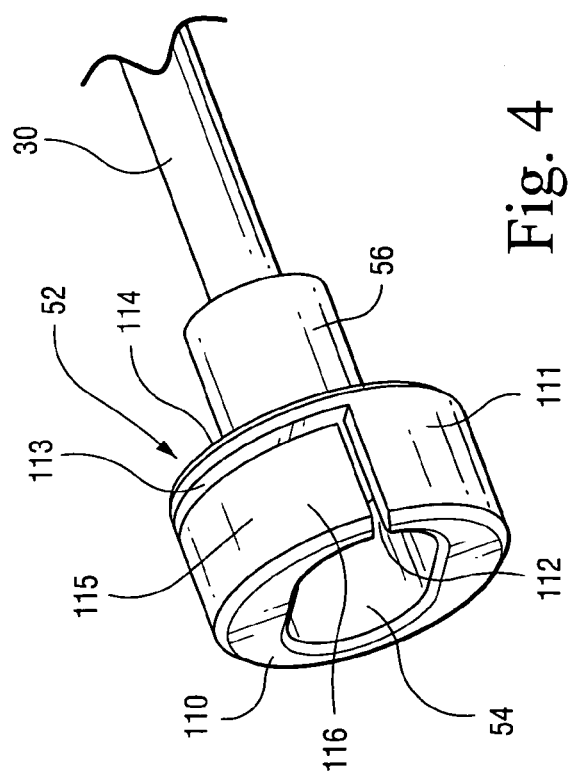
Fig. 5
Fig. 4

TAILGATE LIFT ASSIST DAMPENING DEVICE

FIELD OF THE INVENTION

The present invention relates to vehicle tailgate lift assist assemblies, and more particularly to a dampening device used with such lift assist assemblies.

BACKGROUND ART

Vehicle body closure members, such as tailgates, are typically pivotally mounted between body side panels forming the pillars at the rear of the vehicle. The tailgate typically pivots about a hinge axis between a horizontal, open position and a vertical, closed position. Some tailgate mounting assemblies include a counterbalancing hinge assembly for assisting movement of the tailgate and counterbalancing the weight of the tailgate during opening and closing movements.

For example, U.S. Pat. No. 6,796,592 to Austin discloses a tailgate counterbalancing hinge assembly, which includes a linear torque rod, a first end assembly that pivotally retains the tailgate while permitting the torque rod to be rigidly coupled to the tailgate for movement with the tailgate about a pivot axis, and a second end assembly that pivotally retains the tailgate and permits the end of the torque rod to be rigidly retained with respect to the vehicle body. The assemblies can be mounted in the vehicle using brackets that are secured to the tailgate.

U.S. Pat. Nos. 6,793,263 and 6,769,729 to Bruford et al. disclose an automotive tailgate with a lift assist system in which the tailgate pivots about a generally horizontal pivot axis, with the tailgate including a shell defining an interior space. The tailgate is pivoted upon bearings mounted upon bearing retainers located at each end of the tailgate. A "full floating" torsion bar is disclosed which includes a first end rotationally grounded within the interior of the tailgate shell and a second end engaged with and rotationally locked with one of the bearing inserts so that the torsion bar is subjected to torsional loading as the tailgate is pivoted.

Although torque rod based tailgate counter balancing hinge designs, such as those discussed above, reduce the effort required to raise and lower a tailgate by storing energy in the twisting of the torque rod during opening/lowering, because of the residual kinetic energy stored in the tailgate, the tailgate, when free falling, can cause objectionable impact on the supports straps or on a vehicle operator. Indeed, because a tailgate can be heavy and hard to lift when being closed, or it can drop down quickly when being opened, and thus cause injury to a vehicle operator, the present invention solves these problems by de-accelerating the tailgate and having it come to a gradual stop at the open position, reducing possibility of operator injury or the gate crashing down on the check straps that mount to the vehicle box and keep the tailgate from over traveling.

SUMMARY OF THE INVENTION

The present invention overcomes the above-mentioned disadvantages by providing, in a vehicle closure assembly, a tailgate counterbalancing hinge assembly that uses friction to brake or dampen the fall of a tailgate as it is opened.

The vehicle closure assembly includes a tailgate, first and second end assemblies for carrying the tailgate adjacent to the vehicle's body pillars, and an axially elongated torque rod having a first end received in the first end assembly and a second end received in the second end assembly. Preferably, the first end assembly secures the torque rod to a vehicle body pillar, while pivotably supporting the tailgate at the body pillar. Preferably, the first end assembly includes a bushing having a cylindrical chamber and a mounting stem. The mounting stem secures the bushing either directly to the tailgate or to a mounting bracket that attaches to the tailgate. The chamber receives a pivot body that is pivotally and retractably inserted into the chamber. The pivot body preferably includes a protruding stem with an interior bore that is configured to receive and retain an end of the torque rod and an interior slot into which is inserted a mounting key that is part of a mounting bracket for attaching the pivot body to a side panel of the vehicle.

Preferably, the pivot body includes a circular portion that is larger in diameter than that of the protruding stem that receives the torque rod and a shoulder that extends between the circular portion and the stem. The wall of the circular portion includes a plurality of slits that extend from the outside of the wall into the interior slot of the pivot body. The slits form and/or circumscribe a split part of the wall that deflects relative to the rest of the wall when pressure is applied to the pivot body by twisting of the torque rod. As the tailgate is rotated to its open position, the torque rod is twisted, thereby creating torque within the rod. The torque is then transferred to the pivot body and the key of a mounting bracket by which the pivot body is attached to a side panel of the vehicle. The pressure that is created between the mounting key and the pivot body by the transfer of torque causes the split wall part to deflect outwardly and create friction between an outer surface of the split wall part and an inner surface of the cylindrical chamber within the bushing that receives the pivot body. As the torque rod is twisted further due to the tailgate being opened further, the outward deflection of the split wall part increases, thereby creating greater friction between the outer surface of the split wall part and the inner surface of the cylindrical chamber. This increasing friction creates a progressively increasing braking or dampening effect, which slows the free fall of the tailgate as it is opened.

These and other features of the present invention can best be understood from the following specification and drawings, the following of which is a brief description.

BRIEF DESCRIPTION OF THE DRAWINGS

The present invention will be more clearly understood by reference in the following detailed description of a preferred embodiment when read in conjunction with the accompanying drawings, in which like reference characters refer to like parts throughout the views, and in which:

FIG. 4 is a partial perspective view of a pivot body according to the present invention with a circular portion that includes slits that circumscribe a part of the wall of the circular portion that deflects when pressure is applied to the pivot body by the rotation of a torque rod received by the pivot body.

FIG. 5 is a partial perspective view showing the slit pivot body of the present invention mounted on the key of a mounting bracket by which the pivot body is attached to a side panel of a vehicle.

DETAILED DESCRIPTION OF THE PREFERRED EMBODIMENT

Figure 1:
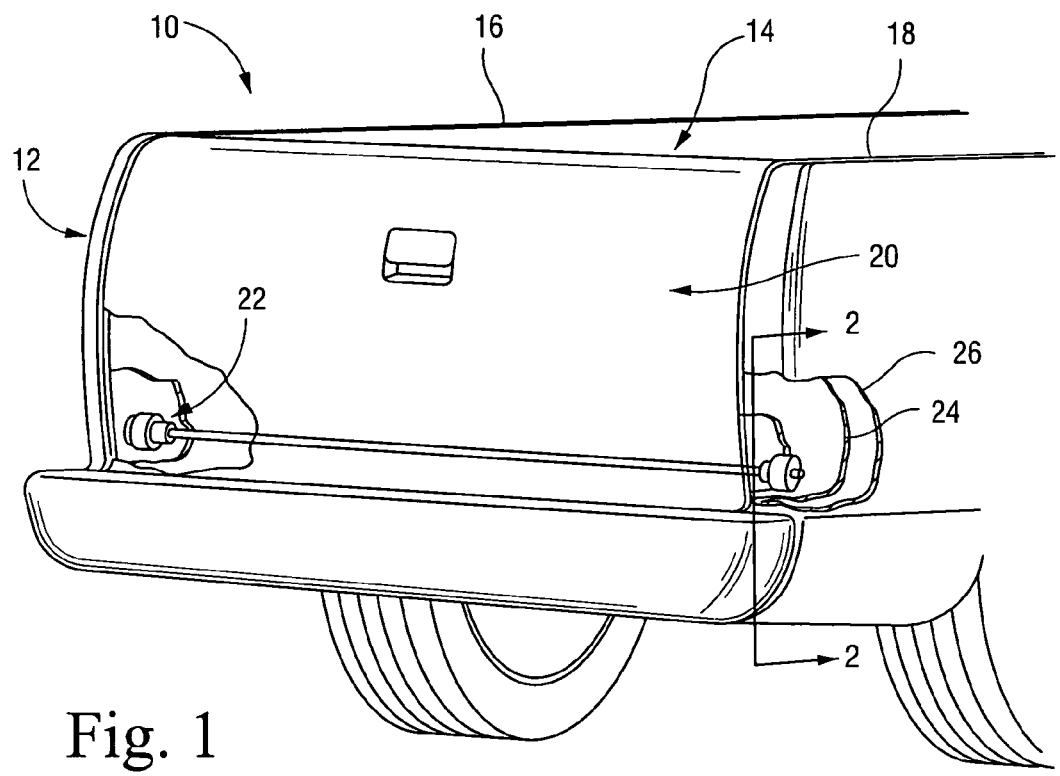
FIG. 1 is a perspective view of a vehicle body tailgate assembly.
Figure 2:
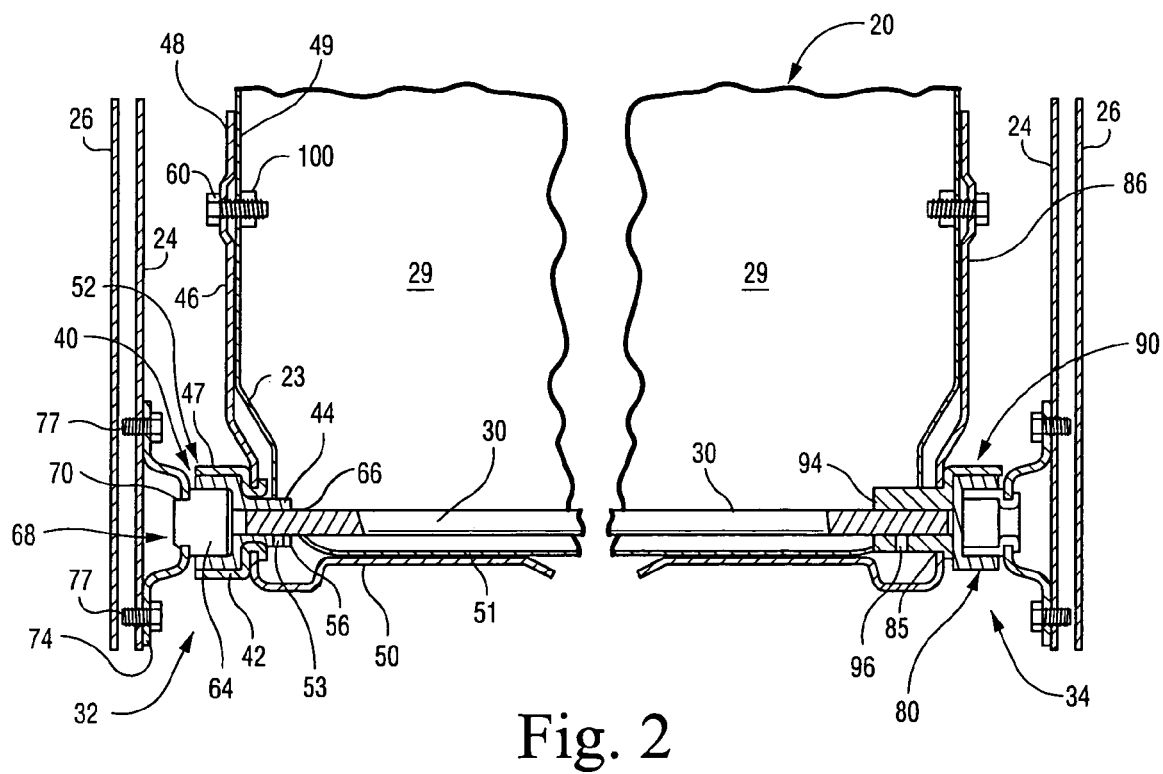
FIG. 2 is a sectional view taken through the tailgate assembly shown in FIG. 1.

FIG. 1 of the present application is a perspective view of a vehicle body tailgate assembly. FIG. 2 of the present application is a sectional view taken through the tailgate assembly shown in FIG. 1. It should be noted that FIGS. 1 and 2 of the present application are substantially identical to FIGS. 1 and 2 of commonly-assigned co-pending U.S. application Ser. No. 11/075,757, filed Mar. 10, 2005, the entire contents of which are incorporated herein by reference.

Referring first to FIG. 1, a motor vehicle 10 is shown having a vehicle body 12 including a rear compartment or bed 14 enclosed by side panels 16 and 18, and a closure member in the form of a tailgate 20. A counterbalancing hinge assembly 22 pivotally supports the tailgate 20 between the sidewalls 16 and 18 in a manner to be described in greater detail below.

Tailgate 20 is pivotally supported between pillars formed by the side panels 16 and 18. Typically, as shown in the cutaway in FIG. 1, body panels, such as side panels 16 and 18 and tailgate 20, are formed by inner and outer panels 24 and 26, respectively, of sheet metal joined at the ends by overlapping flanges or the like that reinforce the planar expanses of the sheet metal forming the side panels. Of course, other materials may be used in constructing the vehicle body 12 and the hinge assembly 22 without departing from the present invention. As a result, although FIG. 1 shows a sheet metal construction in which separated panels 16 and 18 form pillars that support pivotal movement of tailgate 20, other structures may form structurally rigid pillars. Similarly, the tailgate 20 may be made of an interior panel (not shown) and an exterior panel 29, as shown in FIG. 2. The counterbalance hinge assembly 22 includes an axially elongated torque rod 30 that is aligned along a pivot axis between side panels 16 and 18.

Torque rod 30 carries a first end assembly 32 that secures torque rod 30 to vehicle body 12 at a first, left end, as shown in FIG. 2. Torque rod 30 also carries a second end assembly 34 that secures torque rod 30 to tailgate 20 at a second, right end, respectively. It should be noted, however, that the left and right positions of the first and second end assemblies may be reversed without departing from the present invention.

Figure 3:
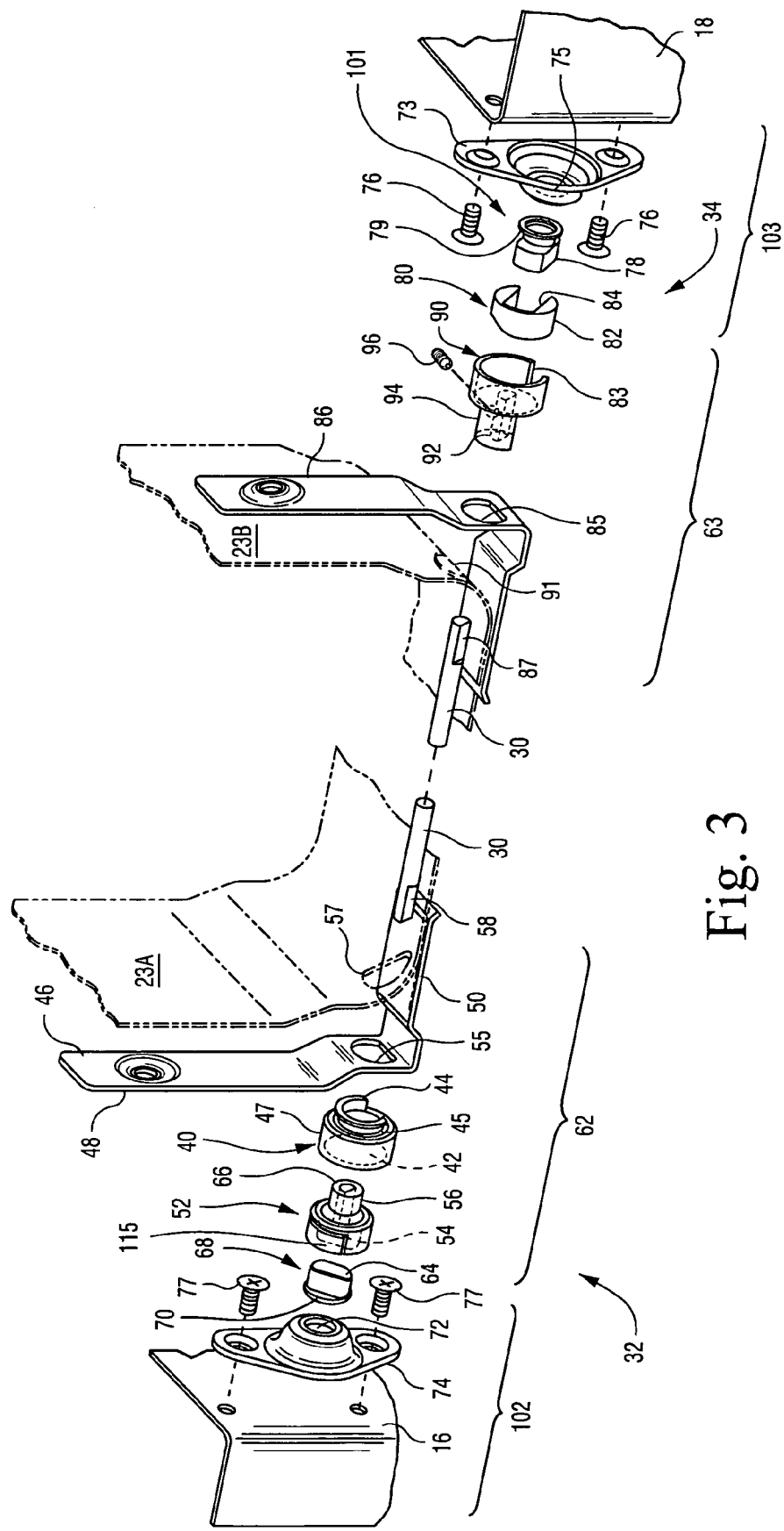
FIG. 3 is an enlarged exploded view of the embodiment of a tailgate counterbalancing hinge assembly employed in the tailgate assembly shown in FIGS. 1 and 2.
Figure 6:
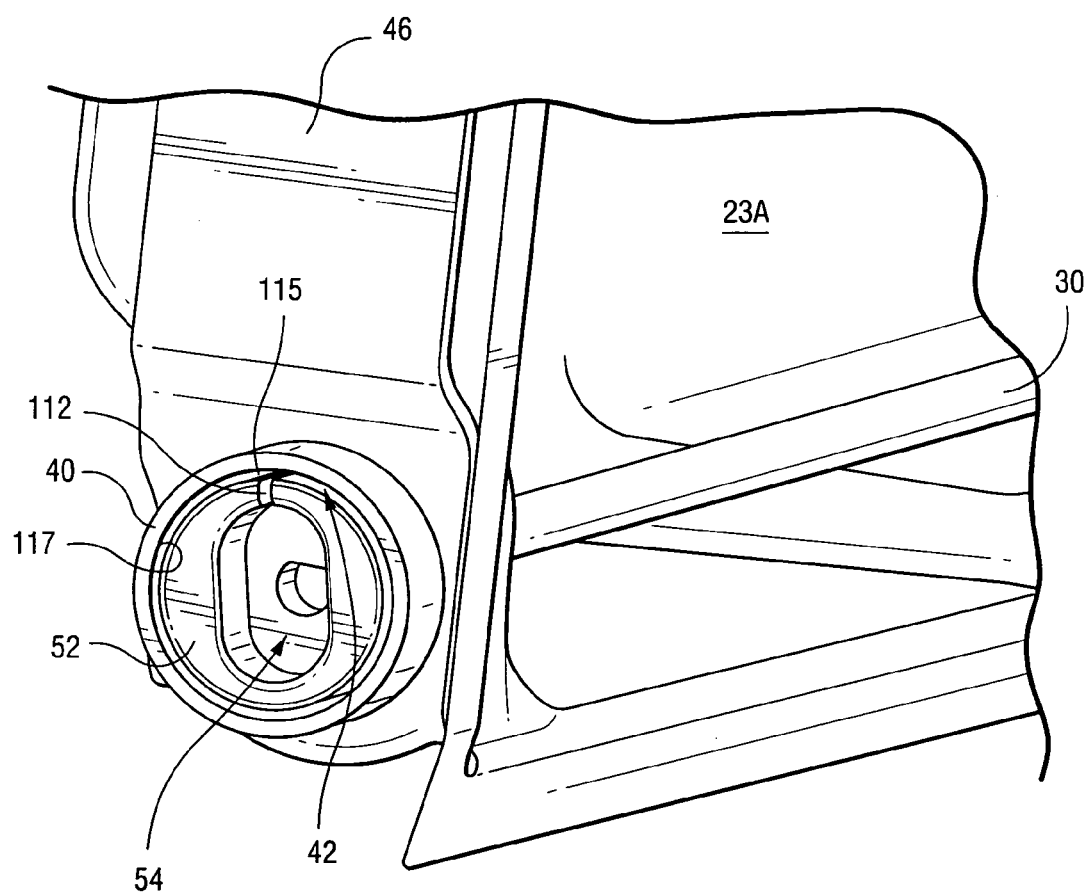
FIG. 6 is a partial perspective view showing the slit pivot body of the present invention inserted into a bushing, which, in turn, is inserted into a mounting bracket that attaches to a vehicle's tailgate.
Figure 7:
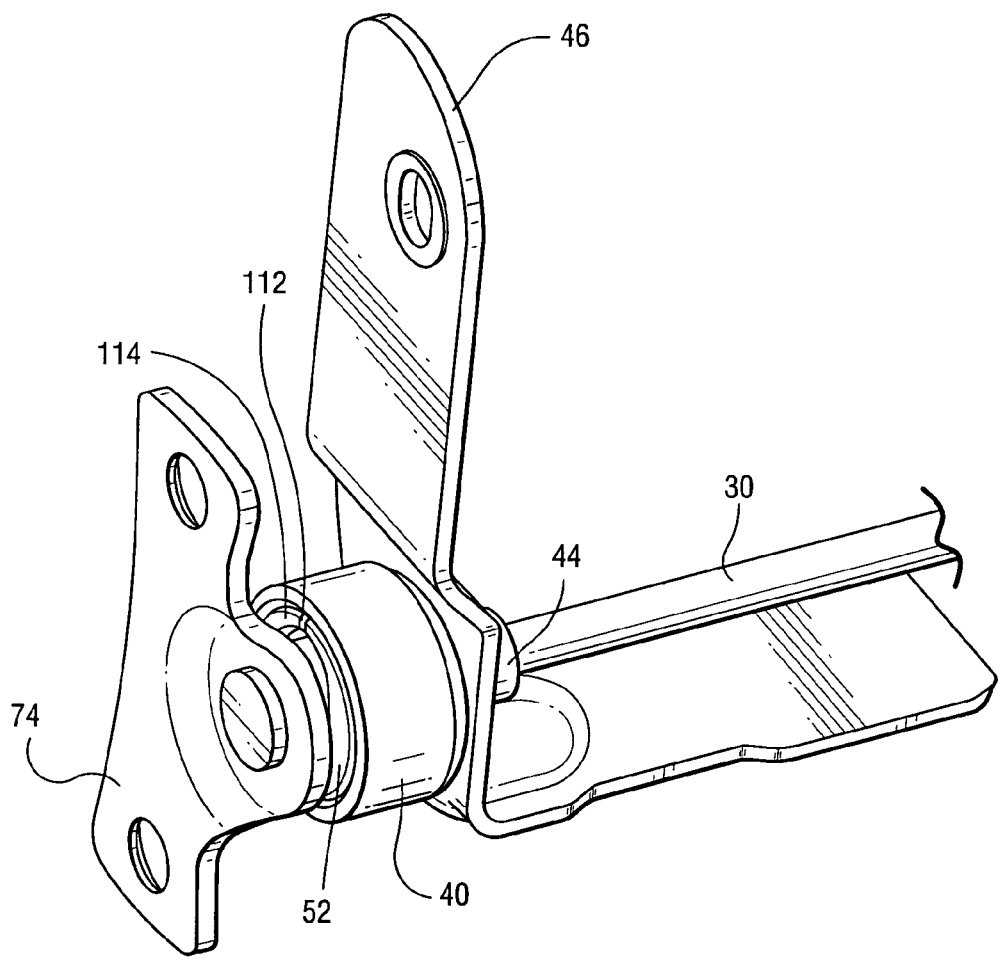
FIG. 7 is a partial perspective view showing the slit pivot body of the present invention inserted into the bushing inserted into the mounting bracket that attaches to a vehicle's tailgate and mounted on the key of the mounting bracket by which the pivot body is attached to a side panel of the vehicle.

The design and construction of first end assembly 32 can be like that shown in FIGS. 2 and 3 of the present application, which is substantially similar to first end assembly 32 shown in FIGS. 2 and 3 of the '757 application.

As shown in FIGS. 2 and 3 of the present application, first end assembly 32 secures torque rod 30 to body 12, while pivotably supporting tailgate 20 at the left body pillar adjacent to left panel 24 of vehicle 10, as shown in FIG. 2. First end assembly 32 includes an end subassembly 62 that forms a left side vehicle hinge pin. Subassembly 62 includes a bushing 40 having a cylindrical chamber 42 and a mounting stem 44. Mounting stem 44 secures bushing 40 to a mounting bracket 46. Mounting bracket 46 is preferably formed to fit and attach to tailgate 20. For example, bracket 46 may have flanges 48 and 50 that engage a side edge 49 and a bottom portion 51 of tailgate 20, respectively. Bracket 46 carries end subassembly 62 that receives an end 58 of torque rod 30.

Subassembly 62 also secures torque rod 30 to body 12. For this purpose, preferably, end subassembly 62 also includes a pivot body 52, which is pivotally or rotatably inserted into chamber 42 of bushing 40. Pivot body 52 preferably includes an interior slot 54 and a protruding stem 56. Stem 56 has an interior bore 66 with a configuration that is preferably faceted to receive and retain a complementary faceted end 58 of torque rod 30. Pivot body 52 may also be welded or otherwise attached to end 58 of torque rod 30.

First end assembly 32 also includes a mounting subassembly 102 for mounting a key 64 that is inserted in slot 54 of pivot body 52 to side panel 16 of vehicle 10. Preferably, mounting subassembly 102 includes a spriget 68 that combines key 64 with a mounting stem 70. Mounting stem 70 is adapted to be inserted in an opening 72 of a bracket 74 that is secured to side panel 16 by bolts, rivets, welding or the like on the pillar adjacent to tailgate 20. Preferably, a fastener, such as a nut or the like, may be positioned beneath bracket 74 for fastening stem 70 to bracket 74, and ultimately to side panel 16 when bracket 74 is screwed to side panel 16 by screws 77. Preferably, opening 72 of bracket 74 is received and retained in stem 70 by riveting. It should be noted, however, that other attachment means, such as bolts or welding, could be used.

Referring now to FIGS. 3 through 7, the pivot body 52 performs the function of providing the friction that serves to brake or dampen the fall of tailgate 20 as it is opened. As can be seen in FIG. 4, pivot body 52 includes a circular body 110 that is larger in diameter than that of protruding stem 56 that receives torque rod 30. A wall 111 of circular body 110 has slits 112 and 113 in it that extend from the outside of wall 111 to the interior slot 54 of pivot body 52. The slits 112 can be made by cutting the pivot body 52 after it has been cast, or as part of the casting of pivot body 52. One of the slits 112 is substantially perpendicular to a shoulder 114 extending between circular body 110 and protruding stem 56, so as to be substantially parallel to the longitudinal axis of torque rod 30. The other slit 113 extends a first distance around the circumference of body 110 and a second distance away from and substantially parallel to shoulder 114, so as to be substantially perpendicular to the longitudinal axis of torque rod 30. Preferably, slit 113 extends approximately half way, or 180°, around the circumference of body 110. Together, slits 112 and 113 form and/or circumscribe a split part 115 of wall 111 of pivot body 52.

When tailgate 20 is rotated open, it creates a torque within correspondingly twisted torque rod 30. The torque within torque rod 30 is then transferred to pivot body 52 and a mounting key 64 by which pivot body 52 is attached to side panel 16 of vehicle 10. As the torque is transferred to pivot body 52 and key 64, pressure is created between these two parts. Slits 112 and 113 in wall 111 of circular body 110 allow split part 115 of circular body 110 to deflect outwardly relative to the rest of wall 111. The deflection of split part 115 creates friction between an outer surface 116 of split part 115 and an inner surface 117 of cylindrical chamber 42 of bushing 40. As torque rod 30 continues to be twisted due to tailgate 20 being rotated to a fully opened position, split part 115 deflects even further, as shown in phantom in FIG. 5, creating greater friction between outer surface 116 of split part 115 and inner surface 117 of cylindrical chamber 42. This increasing friction creates a progressively increasing braking or dampening effect, which slows the free fall of tailgate 20 as it is opened. Preferably outer surface 116 of split part 115 and inner surface 117 of cylindrical chamber 42 are coated with a suitable coating to control friction and prevent the premature gauling and/or wear of these surfaces. One coating that could be used for this purpose is Minlon, a nylon plastic derivative.

The design and construction of second end assembly 34 can be like that shown in FIGS. 2 and 3 of the present application, which is the same as second end assembly 34 shown in FIGS. 2 and 3 of the '757 application discussed above. Referring again to FIGS. 2 and 3 of the present application, second end assembly 34 secures torque rod 30 to tailgate 20, while also pivotably supporting tailgate 20 at the right body pillar adjacent to right side panel 24, as shown in FIG. 2. Second end assembly 34 includes a subassembly 63 that forms a right side vehicle hinge. Subassembly 63 includes a pivot bushing 90 having a stem 94 for attachment to bracket 86, and a bushing insert 80, which is pivotally or rotatably inserted into pivot bushing 90.

Pivot bushing 90 stem 94 preferably has a bore 92 that is adapted to receive in a securing engagement a right end 87 of torque rod 30. Pivot bushing 90 is mounted within an opening 85 of tailgate bracket 86. Preferably, opening 85 is formed in bracket 86 and aligned with a larger opening 91 in tailgate end 23B. Preferably, stem 94 of pivot bushing 90 is locked in correspondingly configured opening 85 of tailgate bracket 86. Subassembly 63 further includes a bushing insert 80 that is inserted within pivot bushing 90. Bushing insert 80, in turn, includes a cylindrical body surface 82 that engages the interior of pivot bushing 90, and a radial slot 84 that interrupts body surface 82 and that is aligned with a slot 83 cut in the body of pivot bushing 90.

Second end assembly 34 also includes a mounting assembly 103 for mounting a second key 78 that is received in slot 83 of pivot bushing 90 and in slot 84 of bushing insert 80. As shown in FIG. 3, key 78 is part of a spriget 101 which includes a stem 79 that is preferably received and retained in an opening 75 of a second bracket 73 by riveting, although other attachment means, such as bolts or welding, could be used. Preferably, bracket 73 is screwed to side panel 18 of vehicle 10 by screws 76, however, other attachment means could be used.

When assembled as shown in FIG. 2, right hand end 87 of torque rod 30 is preferably locked in bore 92 in pivot bushing 90 by a set screw 96. The rigid connection of torque rod 30 to pivot bushing 90 so that torque rod 30 moves with tailgate 20 as it is rotated. Thus, as tailgate 20 is rotated between an upright, closed position and a horizontal, open position, torque rod 30 is forced to twist with tailgate 20's movement.

Preferably, stem 94 is correspondingly sized to fit in opening 85 of tailgate panel attachment bracket 86 that is attached to the end panel 23B of tailgate 20 over an opening 91 (FIG. 3) in end panel 23B. Opening 91 is enlarged to receive stem 94 of bushing 90 to retain the right end 87 of torque rod 30 with respect to tailgate 20.

Although the present invention has been described in terms of a particular embodiment, it is not intended that the invention be limited to that embodiment. Modifications of the embodiment within the spirit of the invention will be apparent to those skilled in the art. The scope of the invention is defined by the claims that follow.

What is claimed is:

1. A device for dampening the movement of a tailgate operated with a torque rod based lift assist assembly, the device comprising:
    a bushing secured to the tailgate;
    a pivot body inserted into and supporting the bushing, a first end of the torque rod being secured to the pivot body,
    a plurality of slits in a wall of the pivot body, the slits circumscribing a split part of the wall that deflects when torque is applied to the pivot body by a twisting of the torque rod in response to a rotation of the tailgate, a second end of the torque rod being secured to the tailgate,
    the split wall part deflecting outwardly and creating friction between the split wall part and the bushing as the torque rod is twisted in response to the tailgate being opened,
    whereby as the torque rod is twisted further due to the tailgate being opened further, the outward deflection of the split wall part increases, thereby creating greater friction between the split wall part and the bushing, resulting in a progressively increasing braking or dampening effect, which slows a free fall of the tailgate as it is opened.

2. The dampening device recited in claim 1, wherein the plurality of slits includes a first slit that is substantially parallel to a longitudinal axis of the torque rod and a second slit that is substantially perpendicular to the longitudinal axis of the torque rod.

3. The dampening device recited in claim 1, wherein the bushing includes a cylindrical chamber and the pivot body includes a circular portion, the plurality of slits extending from an outside of a wall of the circular portion to a slot inside the pivot body.

4. The dampening device recited in claim 3, wherein the pivot body further comprises a stem for receiving the first end the torque rod and a shoulder extending between the stem and the circular portion, and wherein the plurality of slits includes a first slit that is substantially perpendicular to the shoulder and a second slit that extends around the circumference of the circular portion a distance away from and substantially parallel to the shoulder.

5. The dampening device recited in claim 3, wherein the wall in which the plurality of slits are formed is part of the circular body so as to circumscribe the split wall part in the circular body, and wherein the deflection of the split wall part creates friction between an outer surface of the split wall part and an inner surface of the cylindrical chamber.

6. The dampening device recited in claim 5, wherein as torque is created due to the torque rod being twisted, the torque is transferred to the pivot body and a key of a mounting bracket by which the pivot body is attached to a side panel of the vehicle, such that pressure created between the mounting key and the pivot body by the transfer of torque causes the split wall part to deflect outwardly and create the friction between the outer surface of the slit wall part and the inner surface of the cylindrical chamber.

7. A device for dampening the movement of a vehicle's tailgate operated with a torque rod based lift assist assembly, the device comprising:
    a bushing including a cylindrical chamber and a first stem for securing the bushing to the tailgate;
    a pivot body inserted into the cylindrical chamber, the pivot body comprising a second stem for receiving a first end of the torque rod, a circular portion, and a shoulder extending between the second stem and the circular portion, a plurality of slits extending from an outside of a wall of the circular portion to an interior slot of the pivot body, the slits circumscribing a split part of the wall that deflects relative to the rest of the wall when torque is applied to the pivot body by a twisting of the torque rod in response to a rotation of the tailgate, a second end of the torque rod being secured to the tailgate, the split wall part deflecting outwardly and creating friction between an outer surface of the split wall part and an inner surface of the cylindrical chamber as the torque rod is twisted in response to the tailgate being opened, whereby, as the torque rod is twisted further due to the tailgate being opened further, the outward deflection of the split wall part increases so as to create greater friction between the outer surface of the split wall part and the inner surface of the cylindrical chamber, resulting in a progressively increasing braking or dampening effect, which slows a free fall of the tailgate as it is opened.

8. The dampening device recited in claim 7, wherein as torque is created as the torque rod is twisted, the torque is transferred to the pivot body and a key of a mounting bracket which engages the interior slot of the pivot body, such that pressure created between the mounting key and the pivot body by the transfer of torque causes the split wall part to deflect outwardly and create the friction between the outer surface of the slit wall part and the inner surface of the cylindrical chamber.

9. The dampening device recited in claim 7, wherein the plurality of slits includes a first slit that is substantially parallel to a longitudinal axis of the torque rod and a second slit that is substantially perpendicular to the longitudinal axis of the torque rod.

10. The dampening device recited in claim 7, wherein the outer surface of the split wall part and the inner surface of the cylindrical chamber are coated with a coating for controlling friction and preventing premature gauling and/or wear of said surfaces.

11. A vehicle body closure member mounting assembly including a torque rod based lift assist assembly and a mechanism for dampening the movement of the closure member, the mounting assembly comprising:

first and second hinge brackets secured to opposite ends of the closure member, said first and second hinge brackets carrying, respectively, first and second bushings thereon with pivotal axes that are coincident with the axis of pivotal movement of said closure member;

first and second vehicle body hinge pins for mounting on the first and second spaced apart body side panels, respectively, said first and second vehicle body hinge pins being coincident with the axis of pivotal movement of the closure member, and being configured to support said first and second bushings thereon, and in turn, said closure member on which said first and second hinge brackets are mounted;

one of said first and second bushings having a pivot body inserted into said bushing, a first end of the torque rod being secured to the pivot body, a plurality of slits in a wall of the pivot body, the slits circumscribing a split part of the wall that deflects when torque is applied to the pivot body by a twisting of the torque rod in response to a rotation of the closure member, a second end of the torque rod being secured to the closure member, the split wall part deflecting outwardly and creating friction between the split wall part and the bushing as the torque rod is twisted in response to the closure member being opened, whereby as the torque rod is twisted further due to the closure member being opened further, the outward deflection of the split wall part increases, thereby creating greater friction between the split wall part and the bushing, resulting in a progressively increasing braking or dampening effect, which slows a free fall of the closure member as it is opened.

12. The mounting assembly recited in claim 11, wherein the plurality of slits includes a first slit that is substantially parallel to a longitudinal axis of the torque rod and a second slit that is substantially perpendicular to the longitudinal axis of the torque rod.

13. The mounting assembly recited in claim 11, wherein the bushing includes a cylindrical chamber and the pivot body includes a circular portion, the plurality of slits extending from an outside of a wall of the circular portion to a slot inside the pivot body.

14. The mounting assembly recited in claim 13, wherein the pivot body further comprises a stem for receiving the first end the torque rod and a shoulder extending between the stem and the circular portion, and wherein the plurality of slits includes a first slit that is substantially perpendicular to the shoulder and a second slit that extends around a the circumference of the circular portion a distance away from and substantially parallel to the shoulder.

15. The mounting assembly recited in claim 13, wherein the wall in which the plurality of slits are formed is part of the circular body so as to circumscribe the split wall part in the circular body, and wherein the deflection of the split wall part creates friction between an outer surface of the split wall part and an inner surface of the cylindrical chamber.

16. A device for dampening the movement of a tailgate operated with a torque rod based lift assist assembly, the device comprising:

a bushing secured to the tailgate;

a pivot body inserted into and supporting the bushing, a first end of the torque rod being secured to the pivot body, the pivot body including a portion that deflects when torque is applied to the pivot body by a twisting of the torque rod in response to a rotation of the tailgate, a second end of the torque rod being secured to the tailgate, the deflecting portion of split body deflecting outwardly and creating friction between the deflecting portion and the bushing as the torque rod is twisted in response to the tailgate being opened, whereby as the torque rod is twisted further due to the tailgate being opened further, the outward deflection of the deflecting portion increases, thereby creating greater friction between the deflecting portion and the bushing, resulting in a progressively increasing braking or dampening effect, which slows a free fall of the tailgate as it is opened.

* * * * *